(12) United States Patent
Sato et al.

(10) Patent No.: US 7,750,969 B2
(45) Date of Patent: Jul. 6, 2010

(54) CAMERA CALIBRATION SYSTEM AND THREE-DIMENSIONAL MEASURING SYSTEM

(75) Inventors: Yukio Sato, Tokyo (JP); Susumu Shibata, Nagoya (JP)

(73) Assignees: Japan Science and Technology Agency (JP); Spacevision, Inc. (JP)

( * ) Notice: Subject to any disclaimer, the term of this patent is extended or adjusted under 35 U.S.C. 154(b) by 685 days.

(21) Appl. No.: 11/658,105

(22) PCT Filed: Jul. 21, 2005

(86) PCT No.: PCT/JP2005/013357
§ 371 (c)(1),
(2), (4) Date: Jan. 22, 2007

(87) PCT Pub. No.: WO2006/009192
PCT Pub. Date: Jan. 26, 2006

(65) Prior Publication Data
US 2008/0075324 A1     Mar. 27, 2008

(30) Foreign Application Priority Data
Jul. 21, 2004   (JP) ............................... 2004-212947

(51) Int. Cl.
*H04N 5/225* (2006.01)
*H04N 17/00* (2006.01)
*G06K 9/00* (2006.01)

(52) U.S. Cl. ...................... 348/335; 348/187; 382/106; 382/154

(58) Field of Classification Search ................. 348/187, 348/174, 129, 140, 192
See application file for complete search history.

(56) References Cited

U.S. PATENT DOCUMENTS 6,201,882 B1 * 3/2001 Tanaka ....................... 382/106

(Continued)

FOREIGN PATENT DOCUMENTS

JP     11-211414     8/1999

(Continued)

OTHER PUBLICATIONS

International Search Report for International Application No. PCT/JP2005/013357 dated Oct. 25, 2005.

(Continued)

*Primary Examiner*—Luong T Nguyen
(74) *Attorney, Agent, or Firm*—Cantor Colburn LLP (57) ABSTRACT

Camera calibration which is robust against noise factors such as variation in environmental lighting and obstructions is realized. Light-emitting markers, whose on/off states can be controlled, are arrayed in a matrix on a reference panel on which an object is placed. The light-emitting markers blink in accordance with respective switching patterns in synchronism with the frame of continuous imaging of a camera. A three-dimensional measuring instrument determines the time-varying bright-and-dark pattern of a blinking point from the image of each frame and identifies, on the basis of the pattern, to which light-emitting marker each point corresponds. By reference to the identification results, camera calibration is performed, and a coordinate transformation parameter is computed.

8 Claims, 4 Drawing Sheets

U.S. PATENT DOCUMENTS

| | | | |
|---|---|---|---|
| 6,816,629 B2 * | 11/2004 | Redlich | 382/285 |
| 7,068,303 B2 * | 6/2006 | Zhang | 348/187 |
| 7,479,982 B2 * | 1/2009 | Otani et al. | 348/188 |
| 7,564,571 B2 * | 7/2009 | Karabassi et al. | 356/623 |
| 2002/0051006 A1 | 5/2002 | Katagiri et al. | |
| 2004/0037459 A1 | 2/2004 | Dodge | |

FOREIGN PATENT DOCUMENTS

| | | |
|---|---|---|
| JP | 2001-241927 | 9/2001 |
| JP | 2001-264037 | 9/2001 |
| JP | 2001-285681 | 10/2001 |
| JP | 2001-293007 | 10/2001 |
| JP | 2002-98521 | 4/2002 |
| JP | 2003-35515 | 2/2003 |
| WO | WO 02/23122 A1 | 3/2002 |
| WO | WO 02/063240 A1 | 8/2002 |

OTHER PUBLICATIONS

Notice of Grounds for Rejection of Japanese Application No. 2004-212947 dated Oct. 25, 2005.

* cited by examiner

CAMERA CALIBRATION SYSTEM AND THREE-DIMENSIONAL MEASURING SYSTEM

CROSS REFERENCE TO RELATED APPLICATIONS

This is a U.S. national stage of application No. PCT/JP2005/013357, filed on 21 Jul. 2005. Priority under 35 U.S.C. 119(a) and 35 U.S.C. §365(b) is claimed from Japanese Application No. 2004-212947, filed 21 Jul. 2004, the disclosure of which is also incorporated herein by reference.

TECHNICAL FIELD

The present invention relates to a camera calibration system for integrating information based on captured images from free viewpoints in three-dimensional measurement or the like and to a three-dimensional measuring system using the camera calibration system.

BACKGROUND ART

As a method for optically determining a three-dimensional shape of an object (target object), in the related art, various methods have been developed and used, including a stereoscopic imaging method, which is a passive shape measurement method; and a light-sectioning method and a spatial coding method, which are active shape measurement methods. However, in all of these methods, the shape cannot be measured for a portion of the object which is at a backside in relation to the camera or for a portion of the object which is in a blind spot.

In consideration of this, in some cases, for example, multiple cameras are provided on a frame surrounding the object, images from multiple viewpoints are obtained by the cameras, and information of the images are integrated through, for example, a stereoscopic imaging method to calculate the three-dimensional shape. However, this method has a disadvantage in that the equipment becomes large-scaled.

In a device described in Patent Document 1, an object is placed on a turntable, and images of the object on the turntable are captured by a three-dimensional camera while the turntable is rotated. With this process, a three-dimensional shape (depth image) viewed from a plurality of viewpoints is obtained by means of a single camera, and, by integrating the images, a three-dimensional shape is calculated with a smaller number of blind spots. This method also requires a relatively large device; i.e., the turntable.

In another known method, images of an object are captured from various positions while a camera is moved, and a three-dimensional shape of the object is calculated from the thus-obtained images from the multiple viewpoints. In this method, in place of using multiple cameras, one camera is used while being moved. However, the information from the multiple viewpoints cannot be integrated unless the positions and orientations of the moved camera are known. Although the position and orientation of the camera at each image-capturing point can be easily determined by employing a mechanism to move the camera along a track, such a mechanism would increase the size of the device.

In contrast to the related art techniques which require relatively large-scale devices, in recent years, research has been conducted on methods in which the three-dimensional shape of an object is recovered from images captured from free positions by holding a camera in, for example, a hand. In this case, the position and orientation of the camera at each image-capturing position must be determined. One of the methods for determining the position and orientation is a method known as camera calibration.

Various camera calibration methods are known. A representative calibration method is, for example, shown in Patent Document 2, which uses a calibration panel on which a plurality of patterns which differ in shape from each other (such as numbers, barcodes, etc.) are provided. In this related-art technique, an image of the calibration panel and the object are simultaneously captured in the field of view of the camera, calibration software identifies the patterns within the captured image by reference to known information regarding the shapes of the patterns on the panel and positions of the patterns in a global coordinate system, and coordinate transformation parameters between a screen coordinate system and the global coordinate system are calculated on the basis of a correspondence between the positions of the patterns on the two coordinate systems. The coordinate transformation parameter thus represents the position and the orientation of the camera with respect to the panel.

As another method, Patent Document 3 discloses a method in which a plurality of markers made of LEDs (Light-Emitting Diodes) are provided on an upper surface of a measurement head which measures a three-dimensional shape through the light-sectioning method, and an image of a measurement head which is freely placed with respect to the object is captured from above by means of a stereoscopic camera, thereby calculating the position and the orientation of the measurement head in the global coordinate system. In this method, coordinates of various points on the object in a coordinate system centered on the measurement head and measured by the measurement head are transformed by reference to information of the position and orientation of the measurement head determined by the stereoscopic camera, to thereby determine the shape of the object in the global coordinate system.

In the method of Patent Document 2, the shape of the markers (patterns) drawn on the calibration panel would change in response to a relative tilt of the panel with respect to the camera. When the shape of the marker changes, the shape would differ from the shape of the marker registered in the calibration device, and, thus, the identification precision of the markers on the panel is lowered, resulting, in some cases, in inability to calibrate. In addition, although another method is proposed in the related art in which the markers are determined not by shape but by color, the color of the markers on the panel would change due to conditions of the illumination light or the like, and, thus, there has been a problem in that the identification precision of the markers may be lowered depending on the illumination conditions.

Meanwhile, in the method of Patent Document 3, because an LED which emits light is used as the marker for determining the position and orientation of the measurement head, the influences of the difference in illumination on the accuracy of marker identification can be significantly reduced. However, in this method, a single LED is used for a plurality of markers, and the individual marker is identified not on the basis of a characteristic of each marker, but rather on the basis of the placement pattern of the markers on the upper surface of the head. Because of this, when any of the markers on the upper surface of the head cannot be imaged by the stereoscopic camera because of, for example, a shadow of the object moving over the marker, it becomes substantially impossible to automatically determine to which of the plurality of markers the marker being imaged corresponds.

[Patent Document 1] Japanese Patent Laid-Open Publication No. 2002-098521

[Patent Document 2] Japanese Patent Laid-Open Publication No. 2001-264037

[Patent Document 3] Japanese Patent Laid-Open Publication No. 2001-241927

DISCLOSURE OF INVENTION

In the present invention, a light-emitting marker such as a light-emitting diode in which the bright and dark states can be actively switched is used as a marker to be used as a reference for camera calibration, and each of the light-emitting markers is switched between the bright and dark states in accordance with a unique switching pattern. Then, a change pattern of the bright and dark states is determined for each marker on the basis of image frames in which images of the light-emitting markers are consecutively captured, and each marker is identified on the basis of the determined pattern. With such a system, even when the environmental lighting changes or a portion of the markers are hidden by another structure, the individual markers can be identified.

According to one aspect of the present invention, there is provided a camera calibration system comprising an image-capturing device; a reference panel which is placed near an object, an image of which is to be captured along with the object; and a calibration parameter calculator which calculates a coordinate transformation parameter from a coordinate system centered on the image-capturing device to a predetermined global coordinate system, wherein the reference panel comprises a plurality of light-emitting markers provided at different positions on the reference panel, each of which can assume two states, including a bright state and a dark state; and a controller which switches states of the light-emitting markers in accordance with switching patterns which differ from each other and synchronously with switching of frames during consecutive image-capturing of the image-capturing device; and the calibration parameter calculator comprises a marker-identifying unit which specifies a point corresponding to each light-emitting marker in a frame image on the basis of frame images obtained by consecutive capturing, by the image-capturing device, of images of a scene including the object and the reference panel from the same viewpoint, and, for each specified point, matches a changing pattern of brightness and darkness of the specified point between frame images and a switching pattern of states for each light-emitting marker, to thereby identify to which light-emitting marker the specified point corresponds; a parameter calculator which calculates the coordinate transformation parameter from the coordinate system centered on the image-capturing device to the predetermined global coordinate system based on each light-emitting marker of the frame image identified by the marker-identifying unit; and a three-dimensional calculator which determines, on the basis of an image captured by the image-capturing device, a three-dimensional coordinate of each point in the image in the coordinate system centered on the image-capturing device; and a light projector which projects coding light for active-type shape measurement, wherein the parameter calculator determines a three-dimensional coordinate of each light-emitting marker in the frame image in the coordinate system centered on the image-capturing device on the basis of a calculation result of the three-dimensional calculator, and calculates the coordinate transformation parameter on the basis of the three-dimensional coordinate of each light-emitting marker in the coordinate system centered on the image-capturing device and a known three-dimensional coordinate of each light-emitting marker in the global coordinate system; the light projector and the light-emitting markers are set so that at least a portion of light-emitting wavelength ranges do not overlap; the calibration parameter calculator determines, from each frame image consecutively captured by the image-capturing device, an image of a wavelength range which falls within the light-emitting wavelength range of the light-emitting marker and which does not overlap the light-emitting wavelength range of the light projector, and calculates a camera calibration parameter on the basis of the determined images, and the three-dimensional calculator determines, from each frame image consecutively captured by the image-capturing device, an image of a wavelength range which falls within the light-emitting wavelength range of the light projector and which does not overlap the light-emitting wavelength range of the light-emitting marker, and determines the three-dimensional coordinate of each point in the image in the coordinate system centered on the image-capturing device on the basis of the determined images.

The dark state of the light-emitting marker is not limited to a state of non-emission of the light-emitting marker. The light-emitting marker may emit light in the dark state, so long as the light-emitting marker is sufficiently dark to enable clear distinction from the bright state.

According to another aspect of the present invention, there is provided a three-dimensional measurement system comprising an image-capturing device; a reference panel which is placed near an object of a three-dimensional measurement, an image of which is to be captured along with the object; a calibration parameter calculator which calculates a coordinate transformation parameter from a coordinate system centered on the image-capturing device to a predetermined global coordinate system; a three-dimensional calculator which determines, from an image captured by the image-capturing device, a three-dimensional coordinate of each point in the image in the coordinate system centered on the image-capturing device; and a three-dimensional shape-integrating device which transforms a three-dimensional coordinate of each point in an image, captured by the image-capturing device from each viewpoint, in the coordinate system centered on the image-capturing device at each viewpoint determined by the three-dimensional calculator on the basis of the images to a coordinate of the common global coordinate system by means of the coordinate transformation parameter for each viewpoint calculated by the calibration parameter calculator, and integrates the three-dimensional coordinates, wherein the reference panel comprises a plurality of light-emitting markers provided at different positions on the reference panel, each of which can assume two states, including a bright state and a dark state; and a controller which switches the states of the light-emitting markers in accordance with switching patterns which differ from each other and synchronously with switching of frames during consecutive image-capturing by the image-capturing device, and the calibration parameter calculator comprises a marker-identifying unit which specifies a point corresponding to each light-emitting marker in a frame image on the basis of frame images obtained by consecutive capturing, by the image-capturing device, of images of a scene including the object and the reference panel from the same viewpoint, and, for each specified point, matches a changing pattern of brightness and darkness of the specified point between frame images and the switching pattern of states for each light-emitting marker, to thereby identify to which light-emitting marker the specified point corresponds; and a parameter calculator which calculates the coordinate transformation parameter from the coordinate system centered on the image-capturing device to the predetermined global coordinate system on the basis of each light-emitting marker of the frame image identified by the marker-identifying unit.

The three-dimensional measurement system according to the aspect further comprises a light projector which projects coding light for an active-type shape measurement, wherein the light projector and the light-emitting markers are set so that at least a portion of a light-emitting wavelength range does not overlap; the calibration parameter calculator determines, from each frame image consecutively captured by the image-capturing device, an image of a wavelength range which is within the light-emitting wavelength range of the light-emitting marker and which does not overlap the light-emitting wavelength range of the light projector, and calculates a camera calibration parameter on the basis of the determined images; and the three-dimensional calculator determines, from each frame image consecutively captured by the image-capturing device, an image of a wavelength range which is within the light-emitting wavelength range of the light projector and which does not overlap the light-emitting wavelength range of the light-emitting marker, and determines the three-dimensional coordinate of each point in the image in the coordinate system centered on the image-capturing device on the basis of the determined images.

Here, the coding light for the active-type shape measurement projected by the light projector includes, for example, various pattern light used in the spatial coding method, and slit light and spot light to be scanned, which are used in light-sectioning method.

BEST MODE FOR CARRYING OUT THE INVENTION

A preferred embodiment of the present invention will now be described by reference to the drawings.

Figure 1:
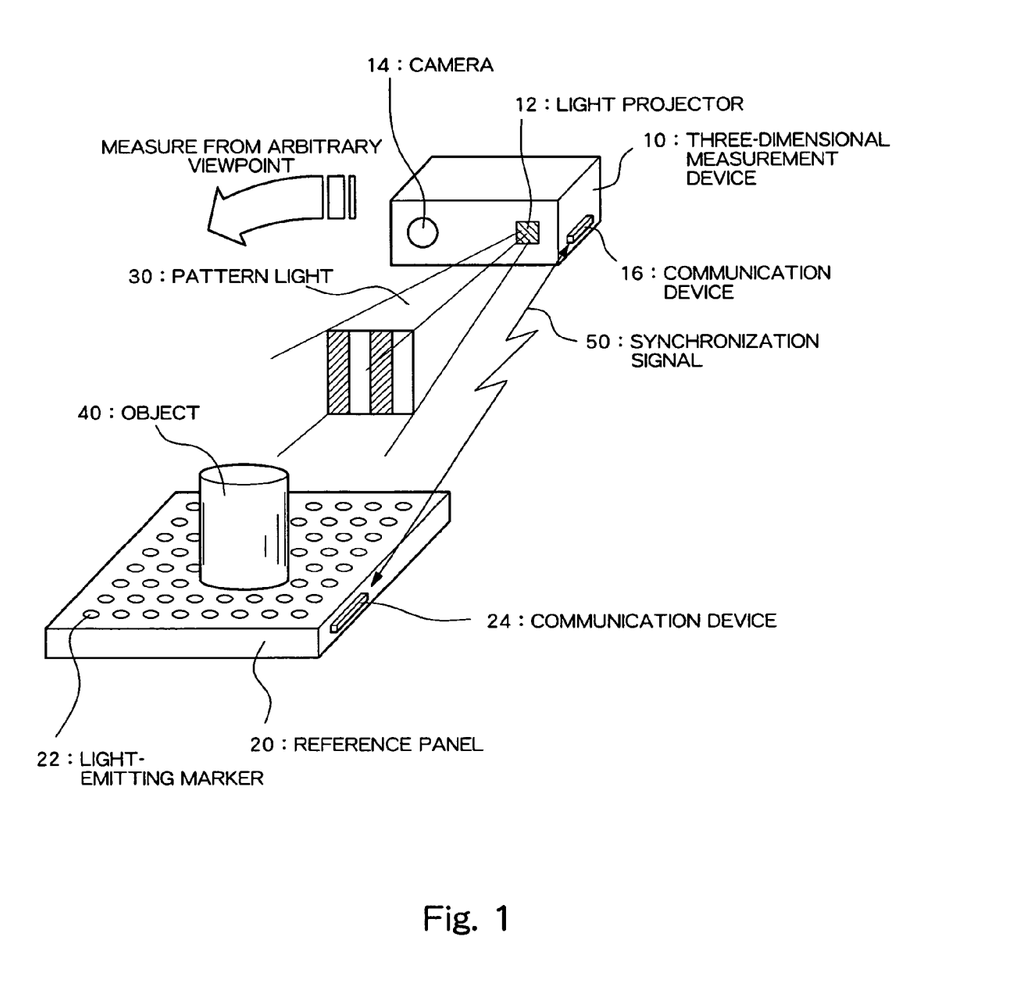
FIG. 1 is a diagram showing an example system configuration of a three-dimensional measurement system according to a preferred embodiment of the present invention.

FIG. 1 is a diagram diagrammatically showing a structure of a three-dimensional measurement system according to a preferred embodiment of the present invention.

As shown in FIG. 1, the present system comprises a three-dimensional measurement device 10 and a reference panel 20. The three-dimensional measurement device 10 is a device which measures a three-dimensional shape through a spatial coding method, and comprises a light projector 12 which projects pattern light 30 for the spatial coding method, and a camera 14 which captures an image of an object and generates electronic captured image data. Although not shown, the three-dimensional measurement device 10 also comprises a storage device, a CPU (Central Processing Unit), a nonvolatile storage medium storing a measurement process program, etc., and calculates a three-dimensional shape of the object by processing, by means of the program, images captured by the camera 14 (details to be described later).

Meanwhile, the reference panel 20 is a panel which serves as a base on which the measurement object 40 is to be mounted, and light-emitting markers 22 serving as a reference for determining the coordinates of each point on the object 40 are placed on the surface of the reference panel 20 in the form of an array (in FIG. 1, 64 light-emitting markers are provided in an 8×8 array). As the light-emitting marker 22, for example, an LED (light-emitting diode) may be employed.

In the present embodiment, the light-emitting markers 22 on the reference panel 20 are lighted and darkened in patterns that differ from each other. Capturing images of the light-emitting markers 22 in motion video by means of the camera 14 enables identification of which light-emitting marker 22 each point corresponds to, by reference to a blinking pattern of each point among image frames in the motion video.

A communication device 16 provided on the three-dimensional measurement device 10 and a communication device 24 provided on the reference panel 20 wirelessly communicate with each other in order to synchronize the switching between image frames in the motion video image-capturing performed by the three-dimensional measurement device 10 and the switching between light emission state and darkened state (non-emission state) of each light-emitting marker 22 on the reference panel 20. In a preferred embodiment, an image-capturing device (for example, a CCD) of the camera 14 modulates, by means of the communication device 16, a synchronization signal for frame synchronization which is used as a reference for the frame periods when image signals of the frames during motion video image-capturing are sequentially output, and wirelessly transmits the modulated synchronization signal to the communication device 24 of the reference panel 20, to thereby achieve synchronization between the switching processes.

The wireless communication is used for the communication of a synchronization signal 50 in order to increase the degree of freedom of movement of the three-dimensional measurement device 10. From this point of view, it is also possible to use another non-contact communication method such as infrared communication in place of the wireless communication. In a system configuration in which the synchronization signal is exchanged by wire connection of the two communication devices through a cable, although a movement range and ease of movement of the three-dimensional measurement device 10 may be partially constrained by the cable and the reference panel 20, other functions similar to those performed in the wireless communication can be realized.

Figure 2:
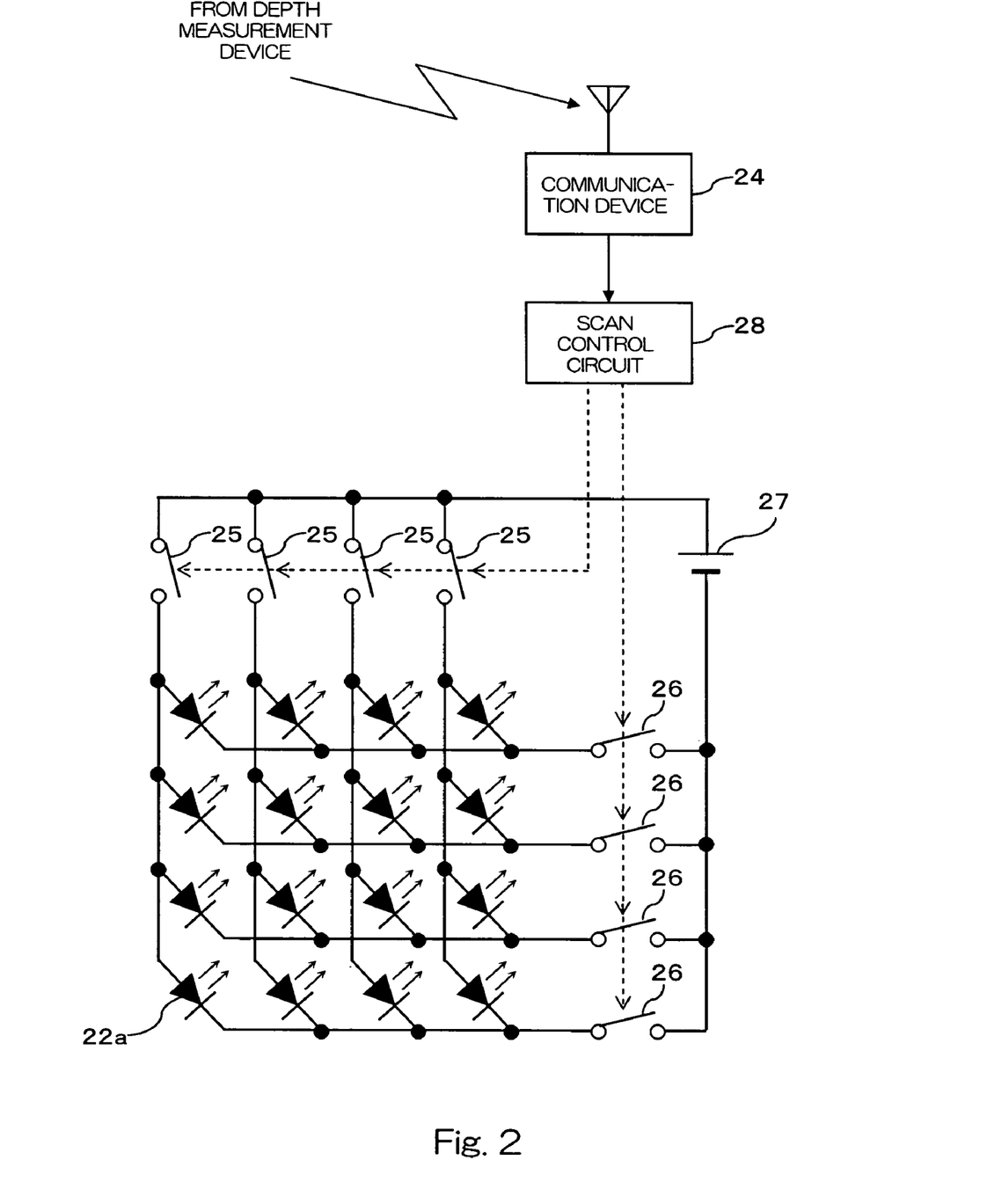
FIG. 2 is a diagram schematically showing a light emission control mechanism of a light-emitting marker on a reference panel.

FIG. 2 schematically shows a light emission control mechanism for the light-emitting marker 22 on the reference panel 20. In the structure shown in FIG. 2, LEDs 22a functioning as the light-emitting marker 22 are arranged in the form of an array (for the sake of simplicity, FIG. 2 shows an example array having 4 rows and 4 columns). One terminal of each LED 22a is connected to a column (vertical) power supply line, and the other terminal of each LED 22a is connected to a row (horizontal) power supply line. The LEDs 22a in the same column are connected to the same column power supply line and the LEDs 22a in the same row are connected to the same row power supply line. Each column power supply line is connected to one electrode of a power supply 27 via a switch 25, and each row power supply line is connected to the other electrode of the power supply 27 via a switch 26. Because the power consumption of the LED 22a is low, the power supply 27 may be, for example, a dry cell or a charged cell.

The switches 25 for the column power supply lines and the switches 26 for the row power supply lines are individually controlled to be opened and closed by a scan control circuit 28. In this configuration, the states of the LEDs 22a can be synchronously switched at least in units of rows and in units of columns.

The communication device 24 demodulates the wireless synchronization signal 50 received from the three-dimensional measurement device 10, and supplies the demodulated signal to the scan control circuit 28. The scan control circuit 28 determines a start timing for each image frame in accordance with the synchronization signal, and synchronously switches the LEDs 22a between the emission state and darkened state at the determined timing. Here, the expression "synchronous switching" does not literally mean that all LEDs 22a are simultaneously lighted or simultaneously darkened, but rather, means that, when the states of the LEDs 22a are to be time-sequentially switched according to individual switching patterns, the determination as to whether or not the state is to be switched is made at the start timing of the frame.

Figure 3:
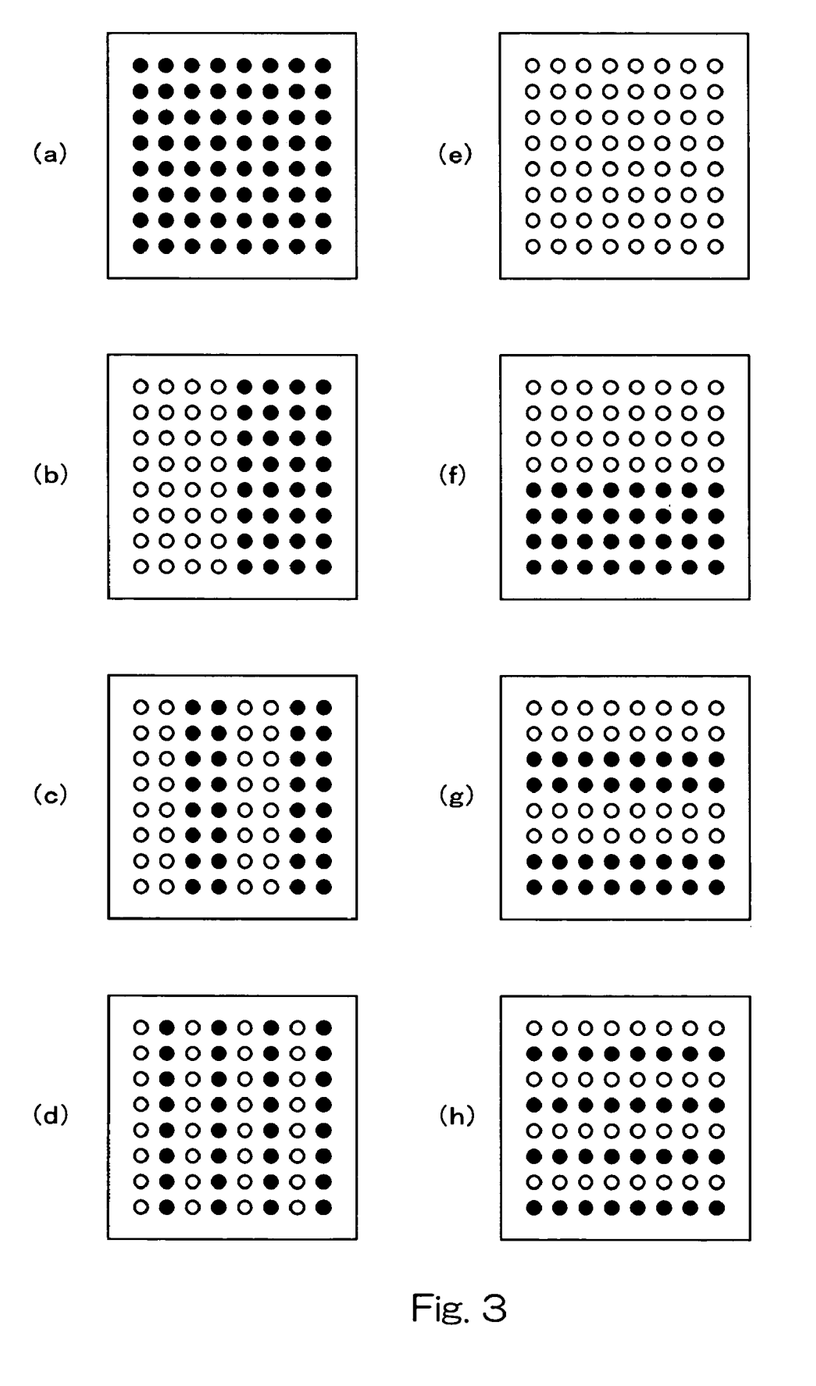
FIG. 3 is a diagram showing an example bright-and-dark pattern of a light-emitting marker array.

FIG. 3 shows examples of switching patterns for the overall 8×8 array of light-emitting markers 22. A pattern (a) is a pattern in which all light-emitting markers 22 are in the darkened state, and a pattern (e) is a pattern in which all light-emitting markers 22 are in the lighted state. A pattern (b) is a pattern in which the light-emitting markers 22 in 4 columns at the left of the array are in the lighted state and the light-emitting markers 22 in 4 columns at the right of the array are in the darkened state. A pattern (c) is a pattern in which lighted and darkened states alternate every two columns, and a pattern (d) is a pattern in which the lighted and darkened states alternate every column. Patterns (f)-(h) are patterns obtained by rotating the respective patterns (b)-(d) by 90 degrees. As will be apparent to a person with ordinary skill in the art, the patterns (b)-(d) and (f)-(h) constitute a group of spatial patterns similar to a group of pattern light in a binary code (with a number of bits of 3) in a spatial coding method.

The patterns (a)-(h) can be realized by control for opening and closing the switches 25 and 26 in the circuit structure shown in FIG. 2 (which can easily be expanded to an array of 8 rows by 8 columns).

The scan control circuit 28 sequentially switches among the eight spatial patterns (a)-(h) for each image-capturing frame. By virtue of this switching control, the light-emitting markers 22 are lighted and darkened with temporal switching patterns which differ from each other. For example, in a case where the spatial pattern is sequentially switched from the pattern (a) through the pattern (h) shown in FIG. 3, if the switching pattern is to be numerically represented with the lighted state represented by 1 and the darkened state represented by 0, the switching patterns can be represented by a code of 8 bits such as the temporal switching pattern of the light-emitting marker on the first row, first column (that is, at the upper left corner) being 01111111 and the switching pattern of the light-emitting marker on the eighth row, first column being 01111000.

In the 8×8 array, each individual light-emitting marker 22 can be identified, in principle, by a code of 6 bits with 6 patterns including patterns (b)-(d) and (f)-(h). However, with the 6 patterns, the position of the light-emitting marker 22 at the eighth row, eighth column (bottom right corner) having a code of 000000 (that is, darkened for all 6 spatial patterns) cannot be identified. In consideration of this, in the present embodiment, the spatial pattern (e) in which all markers are lighted is added so that the position of the marker having 0s in all 6 bits can be identified on the basis of the image captured during light emission. In addition, the spatial pattern (a) in which all markers 22 are in the darkened state is not used for code information, but is used for elimination of noise in the frame images that capture other spatial patterns. Specifically, when environmental light is reflected by the reference panel 20, there may occur a problem such that, for example, the reflection is erroneously recognized as light emission of a light-emitting marker 22. By subtracting the frame image capturing the pattern (a) from the frame images capturing the other patterns; that is, patterns (b)-(h), it is possible to eliminate the influences of such reflection from the images.

In the above, the patterns are described as being switched in sequence from pattern (a) to pattern (h). The order of switching, however, may be different from this configuration. Because identification of the light-emitting marker 22 is achieved by the code of a time sequential switching pattern, the light-emitting markers 22 may be of the same color.

Figure 4:
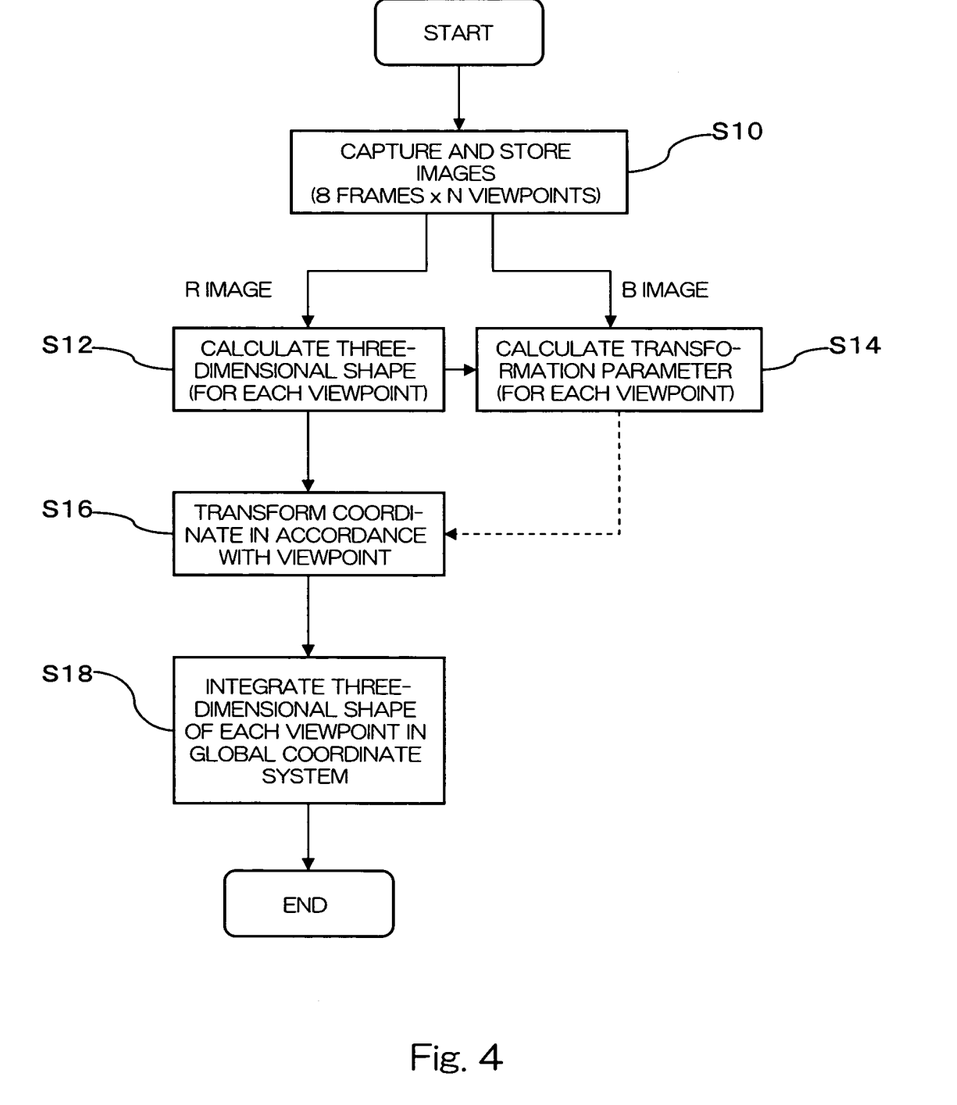
FIG. 4 is a diagram showing a processing procedure of three-dimensional shape measurement.

A procedure for the measurement process in the three-dimensional measurement device 10 will now be described by reference to FIG. 4.

In this process, first, an image-capturing user, while sequentially moving the three-dimensional measurement device 10 among N (which is a natural number) viewpoints which are freely selected by the image-capturing user, captures images of a scene including both the reference panel 20 and an object mounted on the reference panel 20 from the respective viewpoints (S10).

In the image-capturing process at an arbitrary viewpoint, the image-capturing user holds the three-dimensional measurement device 10 pointing at the reference panel 20 and the object 40 from the viewpoint, and consecutively captures images of 8 frames. For example, the three-dimensional measurement device 10 may be programmed such that images of 8 frames are consecutively captured when a shutter button is pressed once. During the consecutive image-capturing, the position and orientation of the three-dimensional measurement device 10 are set to be immovable. During the consecutive (that is, motion video) image-capturing, patterns of pattern light 30 of the spatial coding method and spatial light emission patterns of the light-emitting marker array of the reference panel 20 are switched in synchronization with the switching of the frames. By using 8 patterns as the pattern light 30, the number of patterns is identical with the number of switching patterns of the reference panel 20, and, thus, images of all patterns can be captured in 8 frames.

Here, in the present embodiment, the wavelength range of the pattern light 30 and the light-emitting wavelength range of the light-emitting markers 22 are set so that at least a portion of the wavelengths do not overlap, to thereby enable extraction of an image of the wavelength range of only the pattern light 30 which does not include light emission of the light-emitting markers 22 and of an image of the wavelength range of only the light emission of the light-emitting markers 22 which does not include the pattern light 30, through subjecting the image data to an optical process, a signal process, or a filtering process. The colors of the pattern light 30 and the light-emitting markers 22 may be set to different primary colors of the image-capturing device of the camera 14 (may be three colors of RGB or three colors of CMY) such as, for example, use of a red laser for the pattern light 30 and use of an LED emitting blue color for the light-emitting markers 22. With this configuration, it is possible to separately obtain the image of the pattern light 30 and the image of the light-emitting markers 22 by merely separately extracting the image signal or image data of each primary color of the images captured by the camera 14. In the following, an example configuration will be described in which the color of the pattern light 30 is set to red and the light emission color of the light-emitting markers 22 is set to blue.

The image-capturing process of 8 consecutive frames as described above requires 0.24 s, for example, with a frame rate of 30 ms per frame. By capturing the images while the three-dimensional measurement device 10 is mounted on a tripod or the like, camera shake can be prevented. Alternatively, the frame rate can be increased to prevent camera shake even when the three-dimensional measurement device 10 is held by hand.

The image-capturing process from one viewpoint has been described. In step S10, this process is repeated for each of the N viewpoints selected, in order to eliminate blind spots of the object 40, and frame images obtained by the image-capturing process are stored in a storage device. Thus, full-color image data of 8 frames are stored for each viewpoint. Both reflection light of the red pattern light 30 and reflection light of the blue light emission of the light-emitting markers 22 are captured in these images. The image of the light-emitting markers 22 can be obtained by extracting only a B component from the image data, and the image of the pattern light 30 can be obtained by extracting only an R component. Alternatively, in place of temporarily storing the images as a full-color image and extracting each component, the image signal of the R component and the image signal of the B component output from the image-capturing device of the camera 14 can be stored as separate images (in this case, however, information that these two images correspond to the same frame of the same viewpoint must be stored in some form).

In S12, for each of the 8 viewpoints, a three-dimensional coordinate of each point on the object 40 and the reference panel 20 is calculated in accordance with an algorithm of the spatial coding method and on the basis of R images of 8 frames corresponding to the viewpoint. In view that the algorithm of the spatial coding method is known, the algorithm will not be described here. The three-dimensional coordinate of each point obtained in this calculation is a coordinate in a camera-centered coordinate system.

In S14, for each of the 8 viewpoints, a transformation parameter from the coordinate system of the image centered on the camera 14 into a global coordinate system (also called a "world coordinate system") referencing the reference panel 20 is calculated on the basis of B images of 8 frames corresponding to the viewpoint.

In the calculation in S14, first, the position of each light-emitting marker 22 within the image is determined on the basis of the 8 B images. The position can be determined by determining a point of high brightness (more particularly, a connected region including one or more pixels) from a frame image when all light-emitting markers 22 in the array are set to the lighted state (more preferably, a difference between this frame image and an image when all light-emitting markers are darkened). Here, in the B image, an image which is a reflection, from the object 40, of the light emission of one of the light-emitting markers 22 also has a certain brightness, and may be erroneously determined as the light-emitting marker 22. However, because the reflection from the object 40 has a significantly lower brightness than the light-emitting marker 22, the reflection can be removed by suitably setting a binarizing threshold value, and the probability of erroneous determination can be significantly reduced. Although light-emitting markers 22 which are hidden behind the object 40 as viewed from the viewpoint cannot be detected, this does not cause a problem, because the transformation parameter can be calculated when at least three light-emitting markers 22 among the 64 light-emitting markers 22 can be determined. By setting the distribution range of the light-emitting markers 22 on the reference panel 20 to be sufficiently large as compared with the object 40, it is not difficult to ensure that at least 3 light-emitting markers 22 can be viewed from any point around the object 40. Three is a minimum number when no zoom is used during the image-capturing process. When zoom is to be used, because the magnification must also be determined, images of at least 4 light-emitting markers 22 must be captured.

When the position of each light-emitting marker 22 in the image is identified in this manner, a changing pattern of brightness and darkness at each position of each light-emitting marker 22 is determined on the basis of images of 6 frames (more preferably, a difference between the image and an image when all light-emitting markers are darkened) corresponding to patterns (b)-(d) and (f)-(h). In view that the position and the orientation of the camera 14 can be considered to remain unchanged during the consecutive image-capturing of 8 frames, the same light-emitting marker 22 can be considered to be at the same position in all frame images. Therefore, the change between brightness and darkness can be determined for the same position. Meanwhile, the three-dimensional measurement device 10 has information of a code indicating a temporal blinking pattern of each light-emitting marker 22. Therefore, by determining correspondence between the changing pattern of brightness and darkness at each point and the code, it is possible to determine to which light-emitting marker 22 the image of the light-emitting marker on the image corresponds. Because such a determination method is employed, even when a portion of the light-emitting markers 22 are hidden by the object 40, the imaged light-emitting markers 22 can be identified despite the hidden markers.

When each light-emitting marker 22 and a position thereof are determined in this manner, a transformation parameter from the camera-centered coordinate system in which the images of 8 frames are captured to the global coordinate system defined by the reference panel 20 is calculated on the basis of this information. In this calculation, a three-dimensional coordinate of each determined light-emitting marker 22 is determined on the basis of information of the three-dimensional coordinate of each point determined in S12. The three-dimensional shape determined in S12 is equivalent to a depth image, and a three-dimensional coordinate of a point indicating each light-emitting marker 22 corresponds to a position of the marker 22 within the image, and, thus, the three-dimensional coordinate can be determined. In this manner, three-dimensional coordinates of at least three light-emitting markers 22 in the camera-centered coordinate system can be obtained.

When coordinates of three points are determined, a plane through the three points can be defined. Therefore, by determining a coordinate transformation from a normal vector of a plane on which the light-emitting markers are present and a particular point (for example, a certain light-emitting marker) in the camera-centered coordinate system to corresponding normal vector of the plane on which the light-emitting markers are present and the particular point in the global coordinate system, it is possible to transform, by means of the transformation, the three-dimensional coordinate of each point in the camera-centered coordinate system determined in S12 to a coordinate in the global coordinate system. Because the three-dimensional coordinate of each light-emitting marker 22 in the global coordinate system is known (the coordinate can be defined in advance), a group of transformation parameters for coordinate transformation between the two coordinate systems can be determined.

When 4 or more light-emitting markers 22 are determined from the image, the points are assumed to lie on the same plane, and a normal vector for the plane is calculated by means of a method of least squares. More specifically, for example, when the position vector of each point in the camera-centered coordinate system is set as $Pi(xi, yi, zi)$, a matrix $M = [P1, P2, \ldots, Pn]^T$ including the position vectors is determined and a matrix M' is determined by subtracting a center of gravity of each point from each position vector element of the matrix M. When the points are assumed to lie on the same plane and the unit normal vector of the plane is n, M'·n=0 is satisfied. Thus, n is estimated through the method of least squares such that the error is minimized. The processes performed after the determination of the normal vector will be described below.

A process when the image-capturing process is performed at the same zoom magnification at the viewpoints has been described. It is clear to a person with ordinary skill in the art, however, that a case in which the zoom magnification is changed among the viewpoints also can be handled by expanding the above-described process.

In S14, the transformation parameter is calculated as described above for each of the N viewpoints from which the images are captured.

When the transformation parameter for each viewpoint is determined in this manner, coordinates of the three-dimensional shape, in the camera-centered coordinate system, of the object 40 seen from the viewpoints (which are already calculated in S12) are transformed to coordinates in the common global coordinate system by means of the corresponding transformation parameters (S16). By integrating the three-dimensional shapes in which the coordinates have been transformed, a three-dimensional shape of the object 40 having a small number of blind spots can be determined (S18). In view that an integration process of three-dimensional shapes determined from a plurality of viewpoints is known, S18 may employ such a known method.

A preferred embodiment of the present invention has been described. As described, in the present embodiment, each light-emitting marker 22 forming a position reference can be individually identified by the changing pattern of brightness and darkness, and, thus, each light-emitting marker 22 can be identified regardless of the positional relationships among the light-emitting markers. Therefore, even when some of the light-emitting markers 22 on the reference panel 20 are hidden by the object 40, the light-emitting markers 22 which are not hidden can still be identified without a problem. In addition, because a light-emitting marker 22 is used, there is an advantage that the system tends not to be affected by the illumination conditions.

The above-described preferred embodiment is only exemplary, and changes and modifications can be made within the scope and spirit of the present invention.

For example, in the above-described preferred embodiment, a pure binary code pattern shown in FIG. 3 is used as the spatial brightness/darkness pattern for the light-emitting markers 22. The present invention, however, is not limited to such a configuration, and other binary code patterns such as, for example, a Gray code pattern may be used, or other spatial code patterns may be used.

In addition, in the present invention, it is also possible to employ a circuit structure in which the light-emitting markers 22 of the array can be individually controlled. With such a configuration, the light-emitting markers 22 can be individually lighted and darkened according to free switching patterns that differ from each other.

Moreover, an LED is exemplified as the light-emitting marker 22, but the present invention is not limited to such a configuration, and any light-emitting mechanism may be employed, so long as the light-emitting mechanism can be controlled to be bright and dark.

In the above-described embodiment, a three-dimensional measurement device 10 using a spatial coding method is exemplified. The present invention, however, is not limited to such a configuration, and, alternatively, any of various three-dimensional measurement devices can be used, including a three-dimensional measurement device using a light-sectioning method and a three-dimensional measurement device using a passive stereoscopic imaging method employing a plurality of cameras.

Furthermore, in the above-described embodiment, the number of image frames to be obtained for the three-dimensional measurement (that is, a number of spatial code patterns) and the number of image frames to be obtained for the light-emitting marker identification (that is, a number of bright/dark patterns of the marker array) are the same, but the present invention is not limited to such a configuration.

In the above-described embodiment, the switching between lighted and darkened states of the light-emitting markers is determined for each frame of the captured image frame of the camera 14, but the present invention is not limited to such a configuration, and the determination may be made for every predetermined number of frames.

In addition, in the above-described embodiment, the three-dimensional measurement device 10 not only projects the pattern light and captures an image, but also performs the calculation processes such as the calculation of the three-dimensional shape and the integration of the three-dimensional shapes for the viewpoints (including the camera calibration process), but the present invention is not limited to such a system structure, and there may be employed a system structure in which, for example, the three-dimensional measurement device 10 executes the processes until the image-capturing and sends the captured image data to another calculation device which executes the calculation process.

In the above-described embodiment, a square, flat plate is used as the reference panel 20, but the present invention is not limited to such a configuration, and a reference panel of another shape can be used. For example, the shape does not have to be square. In addition, in place of a flat plate, it is also possible to use a three-dimensional shape having projections and depressions. In the case where a three-dimensional shape is employed, the transformation parameter may be calculated under the assumption that the light-emitting markers on the surface are at the corresponding positions on the three-dimensional surface. The reference panel 20 is not limited to a reference panel 20 used as a base on which the object is mounted as described in the embodiment, and may be, for example, placed in a standing manner as a background of the object.

Moreover, the use of the calculation of the coordinate transformation parameter using the reference panel 20 is not limited to a use for the integration of the three-dimensional shapes from multiple viewpoints as described above, and the calculation may also be used in various fields in which the camera calibration is utilized.

The invention claimed is:

1. A camera calibration system comprising:
an image-capturing device;
a reference panel which is placed near an object, an image of which is to be captured along with the object; and
a calibration parameter calculator which calculates a coordinate transformation parameter from a coordinate system centered on the image-capturing device to a predetermined global coordinate system, wherein
the reference panel comprises:
a plurality of light-emitting markers provided at different positions on the reference panel, each of which can assume two states including a bright state and a dark state; and a controller which switches states of the light-emitting markers in accordance with switching patterns which differ from each other and synchronously with switching of frames during consecutive image-capturing operations by the image-capturing device, and the calibration parameter calculator comprises:

a marker-identifying unit which specifies a point corresponding to each light-emitting marker in a frame image on the basis of frame images obtained by consecutive capture, by the image-capturing device, of images of the reference panel from a same viewpoint, and which, for each specified point, matches a changing pattern of brightness and darkness of the specified point between the frame images and a switching pattern of states for each light-emitting marker, to thereby identify to which light-emitting marker the specified point corresponds;

a parameter calculation unit which calculates the coordinate transformation parameter from the coordinate system centered on the image-capturing device to the predetermined global coordinate system on the basis of each light-emitting marker of the frame image identified by the marker-identifying unit;

a three-dimensional calculator which determines, on the basis of an image captured by the image-capturing device, a three-dimensional coordinate of each point in the image in the coordinate system centered on the image-capturing device; and a light projector which projects coding light for active-type shape measurement, wherein the parameter calculation unit determines a three-dimensional coordinate of each light-emitting marker in the frame image in the coordinate system centered on the image-capturing device on the basis of a calculation result of the three-dimensional calculator, and calculates the coordinate transformation parameter on the basis of the three-dimensional coordinate of each light-emitting marker in the coordinate system centered on the image-capturing device and a known three-dimensional coordinate of each light-emitting marker in the global coordinate system;

the light projector and the light-emitting markers are set so that at least a portion of light-emitting wavelength ranges do not overlap;

the calibration parameter calculator determines, from each frame image consecutively captured by the image-capturing device, an image of a wavelength range which falls within the light-emitting wavelength range of the light-emitting marker and which does not overlap the light-emitting wavelength range of the light projector, and calculates a camera calibration parameter on the basis of the determined images, and the three-dimensional calculator determines, from each frame image consecutively captured by the image-capturing device, an image of a wavelength range which falls within the light-emitting wavelength range of the light projector and which does not overlap the light-emitting wavelength range of the light-emitting marker, and determines the three-dimensional coordinate of each point in the image in the coordinate system centered on the image-capturing device on the basis of the determined images.

2. A system according to claim 1, wherein the image-capturing device comprises a transmitter which transmits a synchronization signal indicating a frame synchronization timing;

the reference panel comprises a receiver which receives a transmitted synchronization signal; and the controller of the reference panel switches the states of the light-emitting markers on the basis of the synchronization signal received by the receiver.

3. A system according to claim 1, wherein the light-emitting markers provided on the reference panel are arranged in the form of an array, and the controller of the reference panel switches the states of the light-emitting markers so that the array of the light-emitting markers forms a brightness and darkness pattern in accordance with a binary code sequence.

4. A system according to claim 1, wherein the controller of the reference panel causes all of the light-emitting markers on the reference panel to emit light at a predetermined reference brightness for a period corresponding to a predetermined reference frame among the frames in which images are to be consecutively captured by the image-capturing device from the same viewpoint; and the marker-identifying unit subtracts the frame image of the reference frame from each of the frame images consecutively captured by the image-capturing device from the same viewpoint, and identifies the light-emitting marker on the basis of frame images after the subtraction.

5. A three-dimensional measurement device comprising:

an image-capturing device;

a reference panel which is placed near an object of three-dimensional measurement, an image of which is to be captured along with the object;

a calibration parameter calculator which calculates a coordinate transformation parameter from a coordinate system centered on the image-capturing device to a predetermined global coordinate system;

a three-dimensional calculator which determines, on the basis of an image captured by the image-capturing device, a three-dimensional coordinate of each point in the image in the coordinate system centered on the image-capturing device; and a three-dimensional shape-integrating device which transforms a three-dimensional coordinate of each point in an image, captured by the image-capturing device from each viewpoint, in the coordinate system centered on the image-capturing device at each viewpoint determined by the three-dimensional device on the basis of the image to a coordinate of the common global coordinate system by means of the coordinate transformation parameter for each viewpoint calculated by the calibration parameter calculator, and integrates the three-dimensional coordinates, wherein the reference panel comprises:

a plurality of light-emitting markers provided at different positions on the reference panel, each of which can assume two states including a bright state and a dark state; and a controller which switches the states of the light-emitting markers in accordance with switching patterns which differ from each other and synchronously with switching of frames during consecutive image-capturing operations by the image-capturing device, and the calibration parameter calculator comprises:

a marker-identifying unit which specifies a point corresponding to each light-emitting marker in a frame image on the basis of frame images obtained by consecutive capture, by the image-capturing device, of images of a scene including the object and the reference panel from the same viewpoint, and, for each specified point, matches a changing pattern of brightness and darkness of the specified point between frame images and the switching pattern of states for each light-emitting marker, to thereby identify to which light-emitting marker the specified point corresponds;

a parameter calculator which calculates the coordinate transformation parameter from the coordinate system centered on the image-capturing device to the predetermined global coordinate system on the basis of each light-emitting marker of the frame image identified by the marker-identifying unit; and a light projector which projects coding light for active-type shape measurement, wherein the light projector and the light-emitting markers are set so that at least a portion of light-emitting wavelength ranges do not overlap;

the calibration parameter calculator determines, from each frame image consecutively captured by the image-capturing device, an image of a wavelength range which falls within the light-emitting wavelength range of the light-emitting marker and which does not overlap the light-emitting wavelength range of the light projector, and calculates a camera calibration parameter on the basis of the determined images; and the three-dimensional calculator determines, from each frame image consecutively captured by the image-capturing device, an image of a wavelength range which falls within the light-emitting wavelength range of the light projector and which does not overlap the light-emitting wavelength range of the light-emitting marker, and determines the three-dimensional coordinate of each point in the image in the coordinate system centered on the image-capturing device on the basis of the determined images.

6. A system according to claim 5, wherein the image-capturing device comprises a transmitter which transmits a synchronization signal indicating a frame synchronization timing;

the reference panel comprises a receiver which receives the transmitted synchronization signal; and the controller of the reference panel switches the states of the light-emitting markers on the basis of the synchronization signal received by the receiver.

7. A system according to claim 5, wherein the light-emitting markers provided on the reference panel are arranged in the form of an array, and the controller of the reference panel switches the states of the light-emitting markers so that the array of the light-emitting markers forms a brightness and darkness pattern in accordance with a binary code sequence.

8. A system according to claim 5, wherein the controller of the reference panel causes all of the light-emitting markers on the reference panel to emit light at a predetermined reference brightness for a period corresponding to a predetermined reference frame among the frames in which images are to be consecutively captured by the image-capturing device from the same viewpoint, and the marker-identifying unit subtracts the frame image of the reference frame from each of the frame images consecutively captured by the image-capturing device from the same viewpoint, and identifies the light-emitting marker on the basis of frame images after the subtraction.

\* \* \* \* \*